United States Patent [19]
Meyer et al.

[11] 3,853,510
[45] Dec. 10, 1974

[54] TWO STAGE HIGH EFFICIENCY AIR FILTER

[75] Inventors: Richard R. Meyer, Glen Ellyn; John M. Kearney, Wauconda; Philip J. Burnstein, Skokie, all of Ill.

[73] Assignee: Systems Discipline, Inc., Des Plaines, Ill.

[22] Filed: Mar. 4, 1974

[21] Appl. No.: 447,518

Related U.S. Application Data

[63] Continuation of Ser. No. 289,575, Sept. 15, 1972, abandoned.

[52] U.S. Cl. .................. 55/368, 55/380, 55/484, 55/500, 55/DIG. 26
[51] Int. Cl. ............................................. B01d 46/04
[58] Field of Search ............ 55/309, 341, 364, 368, 55/378, 380, 381, 382, 482, 483, 484, 488, 489, 490, 491, 511, 500, DIG. 12, DIG. 31

[56] References Cited
UNITED STATES PATENTS

| | | | |
|---|---|---|---|
| 3,396,517 | 8/1968 | Schwab | 55/380 X |
| 3,443,366 | 5/1969 | Schwab | 55/380 X |

*Primary Examiner*—Frank W. Lutter
*Assistant Examiner*—David L. Lacey
*Attorney, Agent, or Firm*—Merriam, Marshall, Shapiro & Klose

[57] ABSTRACT

A two-stage filter in which the first stage, when clean, initially filters both large and small particles from an air stream containing particulate matter, but as loading of the first stage increases, thereby increasing the resistance of the filter, a progressively greater portion of the smaller particles passes through perforations in the first stage into a cavity defined by the walls of the first and second stage filter media to be filtered by the second stage.

1 Claim, 4 Drawing Figures

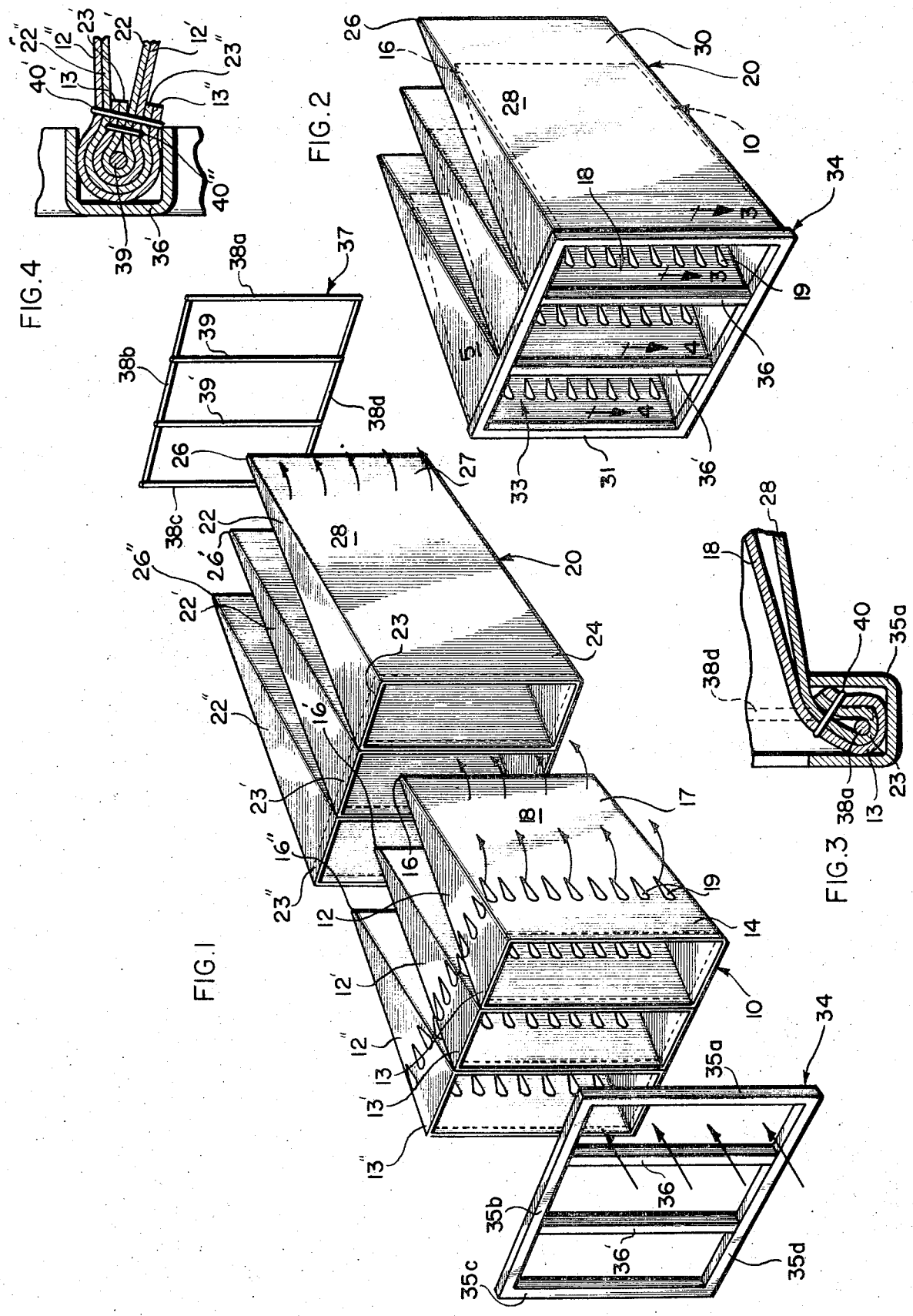

TWO STAGE HIGH EFFICIENCY AIR FILTER

This is a continuation of application Ser. No. 289,575, filed Sept. 15, 1972 now abandoned.

BACKGROUND OF THE INVENTION

The present invention relates generally to a device for filtration of particles suspended in a gaseous medium and more specifically to adaptations of such devices for the filtration of air.

Air filters commonly utilize a fibrous barrier to intercept a gaseous stream containing particulate matter in order to prevent the flow of particles, but at the same time permit flow of the gaseous medium. A major disadvantage of this type of filter is its limited life due to accumulation of particulate matter on the surface of the filter medium. In large part, this problem is caused by the fact that the surface area of these filters was small compared to the cross-sectional area of the stream to be filtered. After accumulated particles have completely clogged the filter element, the flow of gas is thereby impeded. Increasing the gas pressure to provide a functional gas flow causes particles to be forced through the fibrous barrier. Consequently, when a prior art filter becomes substantially clogged, it must be replaced. One obvious method of increasing the life of such a filter is to increase the effective filter area by employing an elongated filter element.

An improved method of increasing the life of the simple prior art filter is disclosed in U.S. Pat. No. 3,204,391 to Schwab. Schwab utilizes an inner and outer bag in which a more porous pre-filter is disposed upstream within a larger, less porous final filter. When the pre-filter, which is positioned at the vortex of the air stream to be filtered, becomes completely occluded by particulate matter, the particle containing air stream is directed through by-passes to the final filter for removal of particles.

Schwab has the disadvantage that when the pre-filter becomes substantially occluded with particulate matter, a large back pressure results. Because of the fact that the pre-filter is located at the vortex of the entering air stream, when the pre-filter becomes occluded very little of the filter proper is available to do the job of filtering a relatively large quantity of air. At this point in the life of the Schwab filter, the filter proper is partially occluded and the pre-filter is completely occluded which results in a considerable decrease in air flow. One advantage of the present invention lies in its extended life and uniform efficiency throughout the life of the filter. A further advantage of the filter of the present invention over the Schwab-type filter is the greater ease of construction made possible by elimination of the more complex Schwab by-pass arrangement.

SUMMARY OF THE PRESENT INVENTION

The present invention considerably reduces the problems associated with prior art filters. The effective filter area is increased in the embodiment shown by utilizing several elongated filter units disposed in side-by-side relation within a single frame.

The present invention has substantial uniformity of filtration efficiency throughout its life. The prior art problems of abbreviated life caused by particle accumulation and the resulting increased pressure required for the filter to function are also remedied by the present invention.

The distribution of particles of various sizes within a typical air sample is set forth in Table I.

Table I

| A | B | C | D |
|---|---|---|---|
| Diam. of particles in microns | Rate of Settling in F.P.M. For spheres of density 1 at 70°F. | No. of particles in one cu. ft. | Surface area in square inches |
| | | Air containing .0006 grains of impurities per cu. ft. (Density = 1) | |
| 8000 | 1750 | | |
| 6000 | | | |
| 4000 | | | |
| 2000 | | | |
| 1000 | 790 | .075 | .000365 |
| 800 | | | |
| 600 | 555 | .6 | .00073 |
| 400 | | | |
| 200 | | | |
| 100 | 59.2 | 75 | .00365 1/16 in. sq. |
| 80 | | | |
| 60 | 14.8 | 600 | .0073 |
| 40 | | | |
| 20 | | | |
| 10 | .592 | 75000 | .0356 ≅ 3/16 in. sq. |
| 8 | | | |
| 6 | .148 | 600,000 | .073 |
| 4 | | | |
| 2 | | | |
| 1 | .007=5" per hr. | $75 \times 10^6$ | .365 ≅ ⅝ in. sq. |
| .8 | .002–1.4" per hr. | $60 \times 10^7$ | .73 |
| .1 | .00007=3/64' per hr. | $75 \times 10^9$ | 3.65 ≅ 1.9 in. sq. |
| | 0 | $60 \times 10^{10}$ | 7.3 |
| .01 | 0 | $75 \times 10^{12}$ | 36.5 ≅ ¼ sq. ft. |
| | 0 | $60 \times 10^{13}$ | 73.0 |
| .001 | 0 | $75 \times 10^{15}$ | 365 ≅ 2.53 sq. ft. |

The present invention utilizes principles which exploit this distribution to give a filter with a long life and uniform efficiency. In the present invention the air stream initially enters the first stage filter medium, which shares a congruent opening with the second stage filter medium, both of which are held in open position by a common frame. When clean, the first stage collects a majority of both the large and small particles, the balance passing through perforations into a cavity defined by the walls of the first and second stage filter media. As first stage loading continues, and its resistance therefore increases, a progressively greater portion of finer particles flows through the perforations into the cavity, while the larger, heavier particles, due to their greater momentum, continue towards the vortex of the first stage where they are collected.

The two stage design takes advantage of the particle size distribution present in an air stream by collecting the large, heavy particles in the first stage, thereby allowing the second stage to collect the proportionately greater number of fine particles present in a typical air stream. This metering of the stream permits uniform accumulation of particulate matter on both the first and the second filter media, which accounts for the long life of the system. As explained, infra, the present invention is especially useful for high flow rate air stream.

Other features and advantages are inherent in the invention as disclosed and claimed herein, or will become apparent to those skilled in the art from the following detailed description with the accompanying drawings.

BRIEF DESCRIPTION OF THE DRAWING

FIG. 1 is an exploded perspective view of the present invention.

FIG. 2 is a perspective view of the present invention in its assembled state.

FIG. 3 is a sectional view taken along line 3—3, showing in detail the frame-filter attachment mechanism.

FIG. 4 is a sectional view taken along line 4—4, showing in detail the frame-filter attachment mechanism of the mullion portion of the frame.

DETAILED DESCRIPTION OF PREFERRED EMBODIMENT

The embodiment described, infra, is the preferred embodiment of the present invention. However, many modifications thereto will be obvious to one skilled in the art.

Referring now to the drawings wherein numerals common for all figures will be used, the invention is a plurality of wedge-shaped filter units 5, each having a first stage filter wedge shaped filter medium 10 disposed inside a second stage wedge-shaped filter medium 20 and maintained in cooperating relationship by frame assembly 31.

More specifically, first stage filter medium 10 is comprised of a plurality of wedge-shaped fibrous filters 12, 12', 12", each terminating in lip portions 13, 13', 13" at open upstream end 14 and having an apex 16, 16', 16" at closed downstream end 17. Walls 18, comprised of material of uniform porosity, extend from each of said lip portions 13, 13', 13" to apeces 16, 16', 16". Located in each of walls 18, near upstream end 14 are a plurality of tear shaped perforations 19. As shown in the drawings, the size of perforations 19 is greater than the porosity of the material which comprises walls 18.

Second stage filter media 20 comprises a plurality of identical wedge-shaped fibrous filters 22, 22', 22" each terminating in lip portions 23, 23', 23" at upstream end 24 and apeces 26, 26', 26" at closed downstream end 27. Second stage filter medium 20 is larger than first stage filter medium 10 so that one may be disposed inside the other and define a cavity or space 30 between the outside surface of first stage filter 10 and the inside surface of second stage filter 20. The flow of the previously unfiltered gaseous stream which has passed through perforations 19, as well as the portion of the stream filtered by first filter medium 10, is filtered through walls 28.

Frame assembly 31 comprises rectangular grill 34 having side portions 35a, 35b, 35c and 35d and detachable mullions 36, 36', said side portions 35a, 35b, 35c and 35d and mullions 36, 36' having channel shaped cross sections. Grid 37 is shaped to fit snugly within the channels of grill 34. Grill 34 may be made of electroplated steel, plastic or other suitably rigid material. Grid 37 is manufactured from wire of a gauge sufficient to provide the requisite strength and rigidity for urging and holding the filter media securely against grill 34.

As shown in FIGS. 1 and 2, grill 34 when fully assembled comprises rigid side members 35a, 35b, 35c, 35d, and rigid mullions 36, 36' all of which have channel shaped cross sections. The elements of grill 34 are positioned to maintain and define openings 33 at upstream end 14.

Grid 37, designed to fit snugly within the channels of rectangular grill 34, comprises semi-rigid side rods 38a, 38b, 38c, 38d and semi-rigid reinforcing rods 39, 39'.

The present invention is assembled by sliding filters 22, 22', 22" of second stage filter medium 20 over and around filters 12, 12', 12" of first stage filter medium 20 respectively such that lip portions 23, 23', 23" overlap lips 13, 13', 13" respectively.

Overlapped lip portions 13 and 23 of filter units 12 and 22 respectively are wrapped around side rod 38a and reinforcing rod 39 of grid 37 and permanently affixed thereto such as by staple 40 shown in FIG. 3.

Overlapped lip portions 13' and 23' and overlapped lip portions 13" and 23" are similarly wrapped around the respective rods of grid 37.

FIG. 4 shows the double wrapping of lip portions 13', 23', 13", 23" of adjacent filter units 5 around reinforcing rods 39, 39' of grid 37 and the securing of said lip portions thereto by means of staples 40' and 40". These doubly wrapped reinforcing rods are inserted in mullions 36, 36' creating a particle tight seal between adjacent units 5 and then are attached to grill 34.

Other means for maintaining the cooperating relationship of said units 5 and their open upstream end 14 will be obvious to those skilled in the art.

Assembly of the filter is completed by first partially assembling grill 34 on three sides by connecting rigid side member 35C at both ends to rigid side members 35b, 35d. Mullions 36, 36' are then positioned over the stapled lip portions of the previously assembled composite at reinforcing rods 39, 39' and the resulting assembly is inserted into the U-shaped channels of the three-sided, partially assembled grill 34. Assembly of the present invention is completed by connecting rigid side member 35a at both ends to rigid side members 35b, 35d to form the fourth side of grill 34.

In an alternative embodiment of the present invention (not shown) a series of foam rubber strips or the like serve the same function as frame 31 and are secured to lips 13, 13', 13'' and 23, 23', 23''. When inserted into an air duct system the foam rubber frame provides a frictional fit requiring no further means of attachment to remain permanently in position.

When the filter is clean, walls 18 of first stage filters 12, 12', 12'' remove most of both the large and small particles. As the first stage becomes clogged, progressively more of the finer particles begin to pass through perforations 19 into cavity 30 defined by walls 18 and 28 to be filtered by second stage filters 22, 22', 22''. After first stage filter units 12, 12', 12'' have become completely occluded, heavier particles, rather than entering perforations 19, continue, due to their heavier weight and resulting greater momentum, toward downstream end 17, where they are deposited on walls 18 with the filtered gaseous stream continuing on into cavity 30 through perforations 19.

This splitting of the air stream of the present invention brings about a meeting of particles between the first and second stages of the filter, which results in a substantial increase in filter life by providing a more uniform distribution of trapped particles.

Although fiber glass, which was commonly used in the prior art, may be used as the filter medium, the present invention is more readily adaptable to the use of non-woven fabrics, which are considerably less expensive than fiber glass.

Fiber glass is difficult to work with due to its delicate nature. Also, fiber glass is not as strong, durable, or reliable as non-woven fabrics since it will easily tear apart upon handling during installation or blow apart during use. To prevent tearing, fiber glass filtering media must be reinforced with inner and outer scrim to protect the inner surface of the fiber glass from erosion and to reinforce its outer surface, which increases the cost of the filter. Also the scrim itself may easily become damaged by folding or snagging, which would make the unit useless.

Non-woven fabrics are preferred for use as filter media in the present invention for the additional reason that perforations 19 would have ragged edges which would tend to become eroded by the air stream to be filtered.

Non-woven fabrics are also preferred to fiber glass for use as filter media for the further reason that with non-woven filter media the filter can be operated efficiently at entering velocities of twice those possible with fiber glass systems. The present invention 13 can handle entering velocities of 50–55 ft./min., whereas a system using fiber glass may be operated only at velocities below 20–25 ft./min. The reason for this wide variation is that while fiber glass collects particles in depth, non-woven fabrics collect particles largely on their surfaces. Use of non-woven fabrics in the present invention gives a filter efficiency of 55–70 percent.

The present invention is generally utilized by positioning it within the opening of an air duct of the same size. In one embodiment of the present invention the dimensions of the face of the filter are 24 × 24 inches and the overall length of the filter is 36 inches, although a smaller embodiment has face dimensions of 16 × 20 inches and an overall length of 16 inches.

In the embodiment shown, teardrop shaped perforations are disposed in one row although alternative embodiments may utilize perforations of other configurations in other alignments.

The foregoing detailed description has been given for clearness of understanding only, and no unnecessary limitations should be understood therefrom, as modifications will be obvious to those skilled in the art.

We claim:

1. An apparatus for filtering particulate matter containing relatively fine and relatively coarse particles from an air stream, said apparatus comprising:

at least one wedge-shaped filter unit having a first wedge-shaped filter comprising filter walls disposed inside a second wedge-shaped filter, the outside surface of said first wedge-shaped filter and the inside surface of said second wedge-shaped filter defining a cavity therebetween;

said first wedge-shaped filter and said second wedge-shaped filter having a common open upstream end;

a plurality of perforations in said filter walls near the upstream end of said first wedge-shaped filter the size of said perforations being greater than the porosity of said filter walls;

so that said perforations direct a substantial portion of said relatively fine particles to said cavity while at the same time permitting said relatively coarse particles to be filtered by the filter walls of said first wedge-shaped filter when the first wedge-shaped filter is less than completely occluded with particulate matter; and, means for maintaining said common upstream end in an open position.

* * * * *